United States Patent [19]
Brocksmith

[11] Patent Number: 5,197,994
[45] Date of Patent: Mar. 30, 1993

[54] METHOD OF HEAT SEALING A BATTERY

[75] Inventor: Donald E. Brocksmith, Plaquemine, La.

[73] Assignee: Daniell Battery Manufacturing Co., Inc., Baton Rouge, La.

[21] Appl. No.: 618,073

[22] Filed: Nov. 26, 1990

[51] Int. Cl.⁵ .................................. H01M 2/08
[52] U.S. Cl. .................. 29/623.2; 429/185; 156/499
[58] Field of Search ............ 429/175, 178, 185; 29/623.2; 156/499

[56] References Cited

U.S. PATENT DOCUMENTS

| | | | |
|---|---|---|---|
| 1,932,136 | 10/1933 | Hole | 113/59 |
| 2,324,523 | 7/1943 | Lund | 29/84 |
| 3,427,205 | 2/1969 | Plitt et al. | 136/133 |
| 3,544,383 | 12/1970 | Oltman | 136/133 |
| 3,560,283 | 2/1971 | Gomis et al. | 429/185 X |
| 3,629,010 | 12/1971 | Hahn | 136/176 |
| 3,686,056 | 8/1972 | Flandt | 429/185 X |
| 4,019,670 | 4/1977 | Cushman et al. | 429/185 X |
| 4,259,419 | 3/1981 | Uba et al. | 429/174 |
| 4,306,355 | 12/1981 | Hawrylo et al. | 29/623.2 |
| 4,390,384 | 6/1983 | Turner | 156/221 |
| 4,507,856 | 4/1985 | Pearson | 29/623.1 |
| 4,509,252 | 4/1985 | Sabatino et al. | 29/623.1 |
| 4,758,482 | 7/1988 | Yamana et al. | 429/53 |
| 4,999,908 | 3/1991 | Piper et al. | 429/185 X |

Primary Examiner—Karl Group
Attorney, Agent, or Firm—Norvell E. Von Behren

[57] ABSTRACT

A heat sealed butt joint for plastic parts such as a battery formed by at least a two step force application. The adjacent portions of the butt joint of the battery cover and case are preheated to a near liquid state causing rollover on the sides of the joint. The first step force application is of a lighter amount and is held for a predetermined time which causes the heated rollover on the sides of the battery to solidify. The second step force is of a heavier amount and is held for a predetermined time which causes the molten polymers of the heated portions of the battery cover and case to mix and bond together while the solidified rollover from the first step acts as a dam to prevent further rollover during the second step. The formed sealed battery has improved bursting strength and the process can be used for joining various other butting plastic parts to improve the tensile strength of the bond between the parts.

7 Claims, 3 Drawing Sheets

| Experiment | Melt Time | Depth of Melt | Average Tensile Strength |
|---|---|---|---|
| 1 | 3.1 | .031" | 1635 ± 236 |
| 2 | 3.4 | .031" | 1490 ± 244 |
| 3 | 3.6 | .031" | 1601 ± 190 |
| 4 | 3.6 | .013" | 1586 ± 337 |
| 5 | 3.6 | .050" | 1715 ± 248 |

FIG-15

| | Calculated | Experimental |
|---|---|---|
| $V_{sy}$ | 4.39 E-2 cm/s | 6.03 E-2 cm/s<br>4.057 E-2 cm/s |
| $\delta$ | 0.009" | — |
| W | .264g<br>.268g | .33g<br>.25g |
| Z | — | 3.562"<br>3.616" |

FIG-13

METHOD OF HEAT SEALING A BATTERY

This invention relates generally to heat sealing adjacent butt joints of plastic parts and more specifically to heat sealing automotive and heavy duty commercial batteries having a top cover and a case made of a copolymer of propylene and ethylene or the like.

Automotive battery cases or containers, until the 1960's traditionally were made of a rubber composition and contained a top cover over each cell in the battery The multi-cover top cover then evolved into a one-piece cover which covered all the battery cells at once. In later batteries, the one-piece top cover was sealed with an epoxy glue to the lower battery case or container.

Various machines were designed during this time to assemble the various battery components, such as battery plates and separators, together into a complete battery. Several such machines are shown in the U.S. Pat. No. 1,932,136, issued on Oct. 24, 1933 to W. W. Hole and in the U.S. Pat. No. 2,324,523, issued on Jul. 20, 1943 to A. D. Lund. Later developed assembling machines are shown in the U.S Pat. No. 4,507,856, issued to E. J. Pearson on Apr. 2, 1985 and in the U.S. Pat. No. 4,509,252, issued to A. Sabatino et al on Apr. 9, 1985.

During the 1960's, battery containers were introduced to the market with the container being made of a copolymer of propylene and ethylene and other constituents. The copolymer is usually referred to as polypropylene in the battery industry. The copolymer container was lighter in weight than the rubber container and had thin walls. This construction permitted larger internal dimensions for a given outside dimension of the container. Another improved feature of the copolymer container was that it had a better impact resistance than the previous rubber container.

The sealing of batteries during this period and in the early 1970's took many forms as typified by the U.S. Pat. No. 3,427,205, issued on Feb. 11, 1969 to K. F. Plitt et al and in the U.S. Pat. No. 3,544,383, issued on Dec. 1, 1970 to J. E. Oltman. Another approach to battery sealing of the top cover is shown in the U.S. Pat. No. 3,629,010, issued to L. W. Hahn on Dec. 21, 1971 which uses a low viscosity sealant material. In addition, machines were soon developed to automatically install the covers on the battery container as shown in the U.S. Pat. No. 4,306,355, issued to S. Hawrylo et al on Dec. 22, 1981.

Development of other advantageous construction arts followed after the change to the copolymer composition for the battery container. Included in these developments were (1) thru-the-partition connections and (2) heat seal bonding of the top cover to the battery container. The thru-the-partition connection is a connection between adjacent battery cells through a hole in the partition wall that divides the cell enclosures. This type connection eliminated obstructions to the entire top of the container after which it became possible to heat seal the top cover to the battery container by heating the mating surfaces of the top cover and the upper periphery and partitions of the battery container.

The heat seal bonding technique required the heating of the top cover and the upper portions of the battery periphery and the partitions to a softened or near liquid state. After this, the mating parts were placed together with just the right pressure to bond the two pieces together. The seal was accomplished within seconds and the use of epoxy glue, with its accompanying Worker health problems was eliminated. In addition the additional expense and cleanup problems associated with epoxy glue was also eliminated.

Heat sealing quickly became the dominate sealing method in the battery industry and the device or machine used to heat and melt the mating surfaces and to seal them together is known as a "Heat Seal Machine". These machines have been commonly used in the industry for about the last two decades staring in the early 1970's and running through the 1980's to the present. Other types of heat sealing machines as well as other sealing techniques can be seen in the U.S. Pat. No. 4,259,419, issued on Mar. 31, 1981 to Toshio Uba and in the U.S. Pat. No. 4,390,384, issued on Jun. 28, 1983 to E. W. Turner as well as the U.S. Pat. No. 4,758.482, issued on Jul. 19, 1988 to Takumi Yamana et al. These patents as well as others show the extent of the developing in the area to try to perfect the seal of the top cover to the battery case.

A novel Battery Heat Sealing Machine and Method is disclosed in the U.S. Pat. No. 4,999,908 of Alan L. Piper et al, Ser. No. 07/435,594, filed Nov. 13, 1989 and assigned to the Daniell Battery Manufacturing Co., Inc. of Baton Rouge, La., the employer of the subject applicant herein. The Piper et al application contains further information and prior art patent references that should be referred to for a deeper understanding of Battery Heat Sealing Machines in general and the Piper et al application will be referred to hereinafter and the information and prior art from the application is incorporated herein by reference. The present heat sealed battery and method is adaptable to be manufactured on that machine and by its novel method with modifications to the machine structure and operation along with the method steps.

In addition, the present novel invention may be manufactured and practiced on various other machines within the spirit and scope of the invention. While the applicant's novel heat sealing concept was designed, in the preferred embodiment, for use in manufacturing the before mentioned batteries it would also be very effective in the heat seal joining of other butt joints of polypropylene or of other plastic components having like density as well as dissimilar densities.

Before detailing the applicant's novel concept, there will be briefly discussed the heat sealing of polypropylene battery cases or containers to the battery top cover to give the reader a better background for the later understanding of the applicant's novel invention. During the year 1989, virtually all of the starting, lighting, and ignition lead-acid batteries were made of polypropylene containers and one piece polypropylene covers. The seal between the polypropylene container and cover is produced by melting the sealing surface of the container and the sealing surface of the cover and then pressing them together. Various machines are in use today to heat seal polypropylene battery containers and covers, as shown in the U.S. patents previously described.

To understand heat sealing in general and to aid in understanding the more technical discussion of the applicant's invention hereinafter, some definitions of the terms and their functions used to describe the process and the control variables will be helpful. These definitions are based on the idea that the control variable in question is the only variable that effects the process.

With this in mind, the following is a list of helpful definitions:

Sealing Surface—The bottom surface of the top cover and the top surface of the case which is heated to a predetermined depth below the surfaces to a molten near liquid form.

Sealing Space—The heated apace between the top cover and the case when they are positioned and pressed together. This space becomes filled with the molten material from the heated sealing surfaces of the top cover and the case.

Melt stop—The control of the height variation on the sealing surface of the container and cover. The melt stop controls maximum upward movement of container or downward movement of the cover (dimensional melt) and is set on the heat sealing machine.

Melt Time—The amount of time the container and cover sealing surfaces are in contact with the hot platen. Time can effect melt depth after the melt stop has been reached and this is on the heat sealing machine.

Force—The force used to press the container and cover on the hot platen. The force used during melting controls the melt depth up to the melt stop.

Heating Platen—The device used to heat the top cover and the container.

Platen Temperature—This temperature controls the rate of melting and is set on the heat sealing machine.

Rollover—The amount of material displaced from the vertical plane of the top cover and the case during melting with the heating platen.

Dimensional Melt—This is the reduction in the height of the container walls or the reduction in height of the cover sealing surface after the melting process. It is also an indication of the amount of material melted.

Melt Depth (Melt)—The vertical dimension of the molten polymer on the container and cover sealing surface and is indicated by $\delta$ in the equations described hereinafter.

Squeeze—The force used in pressing the container and cover together after melting.

In the heat sealing process of the prior art Piper et al application, open battery containers and covers to be fitted or that are already resting on the container are conveyed into the heat sealing machine where the machine stops the battery and the machine locates the cover vertically over the container. A hot platen, usually around 650-800 degrees Fahrenheit, is moved between the container and the cover. The heat sealing machine then lifts the container and lowers the cover into contact with the platen and pushes with a predetermined constant force, melting the sealing surfaces of the container and the top cover. In the melting process, heated rollover forms on the sides of the joint as molten material is displaced out of the vertical plane.

Both container and cover are continually pushed on the platen forming the rollover until either the preset time runs out or a melt stop is reached. Normally the container and cover are melted to a depth of about 0.015" to 0.030". After the time controlling the melting process is complete, the cover and container with the heated rollover on the sides are removed vertically from the platen by the machine, the platen is moved out of the way, and the machine then pushes the container and cover together with a single pressure application for a pre-set time thereby producing the seal.

The seal is produced by the intermingling or mixing of the liquid polymer from the container and cover in the mating area. Prior art type battery heat sealing machines accomplish this mixing by pushing the cover and container together for a preset time with a single constant force after the platen has been removed. This push causes the polymers to mix together and when the mixed polymers freeze or harden it results in a bond of the two pieces. The continued force exerted on the cover and container causes most of the liquid polymer in the mating area to be displaced, leaving very little liquid polymer in the mating area to mix. This causes a weaker bond in the mating area than the parent material of the top cover or case.

SUMMARY OF THE INVENTION

The applicants unique and novel invention is a much improved sealed battery and a process for sealing butt joints of a battery that is adapted to existing heat sealing machines to strengthen the bond between the butting joined surfaces during the heat sealing process of the battery. The process is adaptable for sealing battery top covers to the container or case of the battery and also is usable on various heat sealing applications of joining butt joints of plastics. The two heated butting joints such as a battery top cover and case have their sealing surfaces heated to a near liquid state by a heating platen of the type used in existing battery heat sealing machines. This causes melted rollover on the sides of the butt joints. The unique process described herein comprises the bringing together of two previously heated butting pieces with heated rollover on the sides. The two heated butting pieces are then allowed to touch and adhere to each other with a first light pressure contact force which is held for a predetermined time to permit the heated rollover to solidify with the center area remaining in a molten near liquid state.

After the initial mate of the two sealing surfaces and the predetermined time passes, the perimeter of the molten polymer in the top cover and case in the rollover hardens. After the rollover has hardened but before the interior molten polypropylene area or sealing space between the sealing surfaces has hardened, a second heavier pressure contact force is applied for a predetermined time to the top cover and case from opposite sides to push together to a greater depth the two molten sealing surfaces which form the sealing space between the top cover and the case. The center portion of the melted sealing area of each heated sealing surface is constrained on the sides of the melted sealing area by the previously hardened solidified melt rollover from the first lighter pressure contact force.

The restraint of the hardened melt rollover acts as a dam to limit movement of the melted polymer in the sealing area from flowing out horizontally to each side as the second heavier pressure is applied. The limiting of the horizontal sideways movement of the molten polymer during the application of the second heavier contact force causes a better mix of the melted sealing area between both sealing surfaces in the joining process. This causes a larger quantity of molten polypropylene to be mixed and determines a stronger bond in the heat sealing process.

The strength of the bond is obtained from the intimate mixing of the polymer melts from the top cover and the container. The strength of the bond is a direct result of the intermingling of the polymer chains during the delayed squeeze of the second heavier contact force and results in a much improved battery which has increased tensile strength and bursting strength.

The unique process produces heat sealed batteries which have sealing areas between the sealing surfaces of the top cover and the case which are spaced apart substantially parallel along the planar surface. The sealing areas also contain a substantially equal amount of molten polymer throughout the sealing space in equal cross-sectional planes throughout the area. In other words, various cross-sectional cuts taken through the sealing area in a transverse direction would all show substantially the same size area. In addition, various cross-sectional cuts taken through the sealing area in a longitudinal direction would all look substantially alike.

This even and uniform size distribution of the solidified sealing area of the applicant's invention would be in distinction to the prior art formations which were obtained with one continuous contact force application. The prior art one continuous contact method deforms the sealing surfaces of the top cover and the case into downward sloped sides with central portions which are generally unmelted and therefore unbonded. The prior art one continuous contact method thereby produced a weaker sealed structure resulting from the deformed sealing surfaces as will be explained in more detail hereinafter when referring to FIGS. 1–6 of the drawings and especially to FIG. 6 which is illustrative of the final deformed condition using prior art methods.

Accordingly it is an object and advantage of the invention to provide a heat sealed butt joint for batteries and other products which has increased bursting strength and tensile strength.

Another object and advantage of the invention is to provide a novel two step sealing process for heat sealing adjacent butt joints using a first lighter force application of a predetermined time followed by a second heavier force application of a predetermined time with the two step delayed force applications providing better mixing and physical bonding of the molten polymers used in the butt joints.

Still another object and advantage of the subject invention is to provide a new and novel two step pressure process which may be used on existing battery heat sealing machines with minor modifications and which will thereby improve the heat seal quality of the batteries being sealed in the machine.

These and other objects and advantages will become apparent from a review of the drawings and from a study of the preferred embodiment hereinafter given by way of illustration only.

DESCRIPTION OF THE PREFERRED EMBODIMENT

Figure 1:
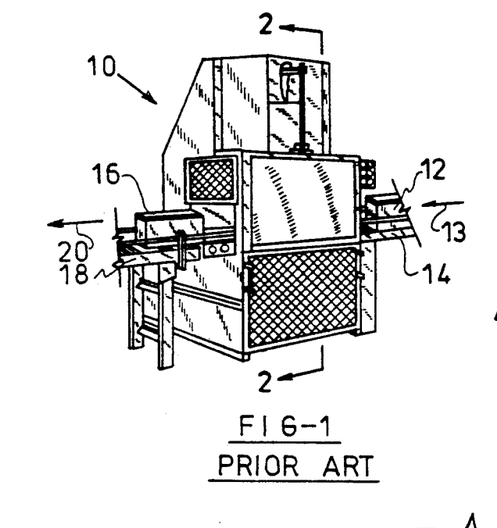
FIG. 1 is a perspective view of a prior art battery heat sealing machine which may be modified to use the applicants novel process to provide improved heat sealed batteries.

Referring now to the drawings in general and in particular to FIGS. 1–6 of the drawings, there is shown in FIG. 1 a perspective view of the before described prior art battery heat sealing machine of the Piper et al application generally by the numeral 10. Unsealed batteries 12 are moved into the machine in the direction of the arrow 13 along an inlet conveyor 14 and the heat sealed batteries 16 are moved out of the machine on the outlet conveyor 18 in the direction of the arrow 20.

Figure 2:
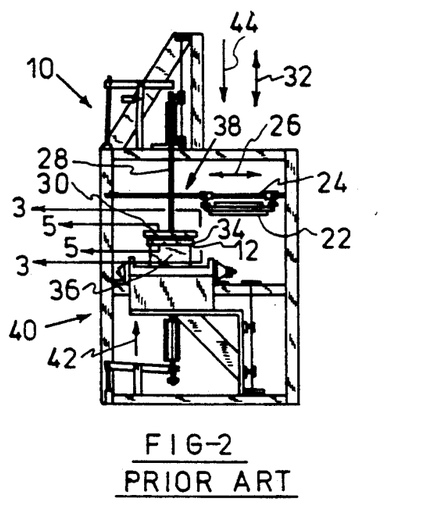
FIG. 2 is an elevational view, taken along lines 2—2 of FIG. 1 showing the one step continuous pressure step of heat sealing of a battery top cover to the battery case used in the prior art battery heat sealing machine.

FIG. 2 shows an elevational view, taken along lines 2—2 of FIG. 1, of the prior art single continuous pressure step of prior art heat sealing using the heating platen 22 which moves horizontally on a rod 24 in the direction of the arrow 26. A lifting plate 28 is used to lift the battery top cover holder 30 up and down in the direction shown by the arrow 32 as the top cover 34 is positioned on the lower case 36. Reference should be made to the before described Piper et al application for a more detailed explanation of the entire novel prior art heat sealing machine.

Figure 3:
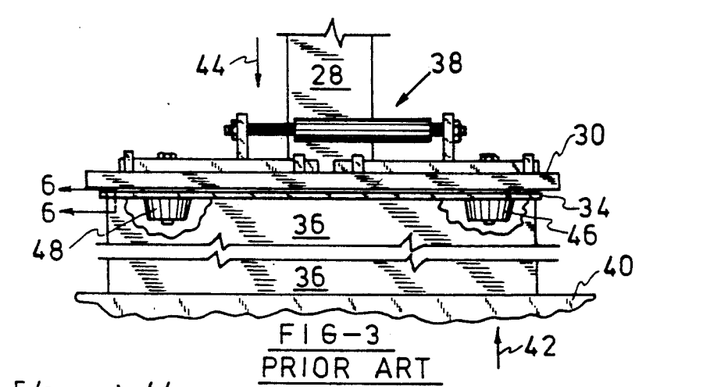
FIG. 3 is an elevational view, taken along lines 3—3 of FIG. 2 showing in more detail how the top cover holder applies the top cover to the battery case in the prior art single pressure step.

FIG. 3 is an elevational view, taken along lines 3—3 of FIG. 2 and shows in more detail how the top cover holder 30 applies the heated top cover 34 of the unsealed battery 12 to the heated battery case 36 using the lifting fingers 46 and 48 shown in the cut-away portion of FIG. 3. The top cover melt stop mechanism 38 along with the battery lifting mechanism 40, shown in FIG. 2, is used to apply forces to the unsealed battery to accomplish the sealing process An upward force shown by the arrow 42 along with a downward force shown by the arrow 44 are applied by the mechanisms 38 and 40 in a one step continuous force which starts at 0 pounds and is continuously raised to 1200 pounds applied over the area of the mating parts of the top cover and the battery case until the battery is sealed.

Figures 4, 10:
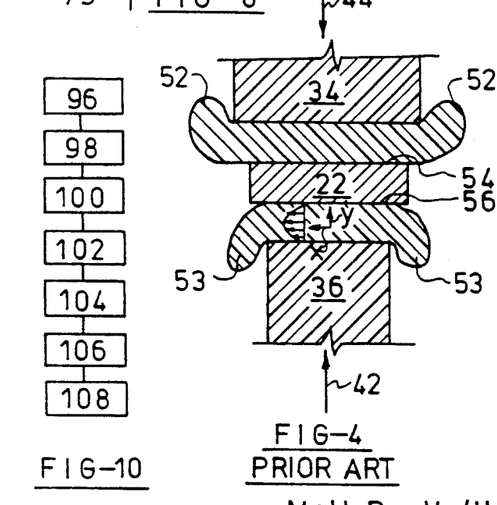
FIG. 4 is a cross-sectional representation, showing how the heating platen is used to soften the sealing surfaces of the top cover and the case in the prior art application.
FIG. 10 is a diagrammatic drawing of the steps in the novel heat sealing process using the unique two step pressure application.

FIG. 4 is a cross-sectional representation of the prior art heating step of melting the sealing surfaces of the top cover 34 and the case 36 with the centrally positioned heating platen 22. As the top cover 34 and the case 36 are heated by the heating platen 22, the sealing surfaces 54 and 56 are softened by the forces 42 and 44 applied by the heat sealing machine. This causes the rollover 52 and 53 to be formed on the sides as the pressure applied squeezes the top cover 34 and case 36 against the heating platen 22 to melt the sealing surfaces to a molten near liquid state.

Figure 5:
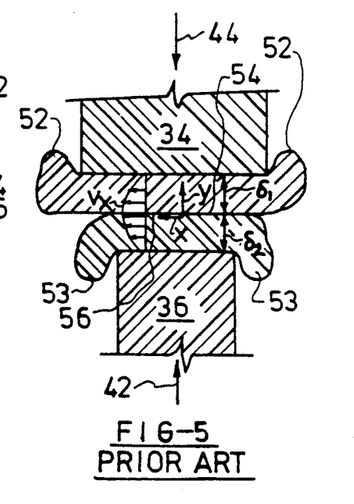
FIG. 5 is a cross-sectional view, taken along lines 5—5 of FIG. 2 showing the joining of the heated top cover and case in the prior art application.

FIG. 5 is a cross-sectional view, taken along lines 6—6 of FIG. 3 showing the heated sealing surfaces brought together in the prior art prior application of the one step continuous force application. The sealing surfaces 54 and 56 are juxtaposed prior to the application of the one continuous force application of the forces 42 and 44. The melted portions of the top cover 34 and the case 36 are shown cross hatched and appear to be shaped like a dog bone prior to the one step continuous force application prior art.

Figure 6:
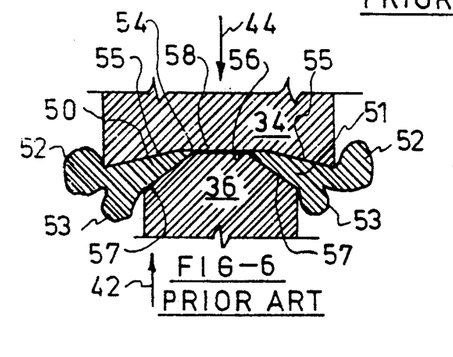
FIG. 6 is a cross-sectional view, taken along lines 6—6 of FIG. 3 showing the deformed condition of the prior art sealed top cover and the case with the thin unsealed area shown in the central portion thereof.

FIG. 6 is a cross-sectional view, taken along lines 6—6 of FIG. 3 and shows the before described deformed condition of the prior art sealed top cover 34 on the lower case 36 when using the prior art single step continuous pressure method of heat sealing. After the sealing surfaces 54 and 56 of the top cover 34 and case 36 are heated to a molten near liquid state by the heating platen 22, the prior art single step continuous force application applies the forces 42 and 44 to the top cover 34 and the case 36 to bring them together. During this time, the heated rollover 52 and 53 on both sides of the top cover 34 and case 36 is not yet solidified and remains in a molten state.

During this single prior art continuous prior art pressure process, the outer adjacent portions 55 and 57 of the sealing surfaces 54 and 56 of the top cover 34 and case 36 become distorted and slope downward as shown as the melted near liquid polymer of the top cover and case forms the molten polymer areas 50 and 51. The melted rollover 52 and 53 then enlarges on each side of the butt joint and this rollover finally then solidifies to the shape shown. This shape looks like a crushed dog bone as can be seen in FIG. 6. While this prior art process is satisfactory to heat seal the top cover to the case, an unsealed contact area 58 in the center of the joint is formed as the molten polymer 50 and 51 is displaced. In the unsealed contact area 58, the adjacent sealing surfaces 54 and 56 are not mixed and bonded together like the polymer in the molten areas 50 and 51.

in addition, the prior art sealed joint shown in FIG. 6 has a varying non-uniform cross-sectional area throughout the joint both in the transverse direction and in the longitudinal direction. The uneven bonding of the prior art joint results in an uneven bonding throughout the entire joint which is greatly improved by the use of the applicants novel multiple step process bonding.

Figure 7:
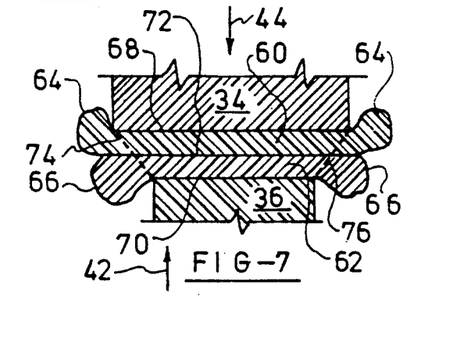
FIG. 7 is a view similar to the view of FIG. 6 showing how a modified prior art sealing machine using the applicants novel process would apply a first lighter pressure force to the top cover and the case to solidify the rollover in a two step force application of the subject invention.
Figure 8:
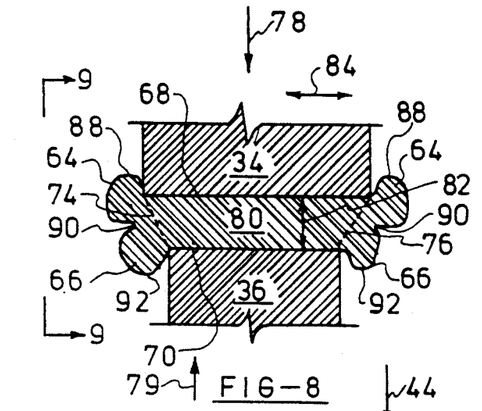
FIG. 8 is a view similar to the view of FIG. 7 showing how the second heavier pressure force application of the subject invention is used to mix and bond the sealing area with the solidified rollover of the first lighter pressure force application providing a solidified rollover dam which prevents further melt rollover during the second heavier pressure force application.

Referring now to FIGS. 7 and 8 of the drawing there will be shown and described how the applicant's novel two step pressure application greatly improves the sealing of the butt joints. FIG. 7 is a view similar to the view of FIG. 6 and shows how the prior art one step sealing machine could be modified to apply a first step light pressure force to the top cover 34 and the case 36 to solidify the rollover 52 and 53 so that it retains its original form and stays as shown at 64 and 66.

Using the applicant's novel process, the first contact force of a lighter amount is applied by the forces 42 and 44 from the heat sealing machine and is held for a predetermined time to solidify the rollover 64 and 66 while still leaving the spaces 60 and 62 in the center in a molten condition. In FIG. 7, the unmelted top cover line is shown as the numeral 68 while the unmelted case line is shown by the numeral 70. The numeral 72 represents the previously heated sealing surfaces 54 and 56 of the top cover and case as they are brought into contact with each other. The dashed lines 74 and 76 represent the extent of the sealed area upon completion of the novel two step process. In experiments, it was found that a first contact force of 100 pounds applied across the sealing surfaces 54 and 56 would be sufficient, if held for about three seconds, to solidify the rollover 64 and 66 while keeping the polymers molten in the areas 60 and 62. The lighter first contact force would be applied by modifying the prior art heat sealing machine to press and hold this force for the desired time. The pressures and times given are for the applicant's particular machine and may vary from machine to machine within the scope of this invention.

Referring now to FIG. 8, there is shown a view similar to the view of FIG. 7 and represents the application of the second heavier pressure force application to mix and bond the sealing area with the previously solidified rollover 64 and 66 preventing further rollover and distortion of the top cover and case sealing surfaces as shown previously in the prior art representation of FIG. 6. After the rollover has solidified in the first step lighter pressure application, the second contact force is applied continuously from approximately 100 pounds to approximately 1200 pounds across the sealing surfaces The second heavier contact force represented by the numerals 78 and 79 would be held approximately 3 to 4 seconds which will permit the molten central plastic areas 60 and 62 to mix and to physically bond the molten polymers from the sealing surfaces of the top cover 34 and the case 36 into the central area 80. The previous solidified rollover 64 and 66 prevents further rollover from being formed by acting as a dam and also prevents the previously described distorted condition that appears as a broken or crushed dog bone illustrated in the prior art one step continuous sealing process of FIG. 6. The second step forces 78 and 79 would be applied by the same heat sealing machine forces 44 and 42 used in the first step force application and would also be obtained by modifying the prior art healing sealing machine to press and hold these forces for the desired time. These pressures and times given are also for the applicant's particular machine and may vary from machine to machine within the spirit and scope of the invention.

While the pressures and times used in the applicant's two step process are illustrative of the preferred embodiment; shown, these times and pressures may be varied also for other applications within the spirit and scope of the applicants invention. The variables in the novel two step process will be further described when referring to FIGS. 11-15 of the drawings which presents a more detailed explanation of the invention.

Figure 9:
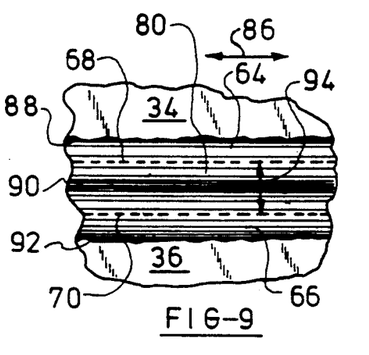
FIG. 9 is a side elevational view, taken along lines 9—9 of FIG. 8 showing in dashed lines the even distribution of the melted sealing area along the butt joint in the longitudinal direction.

Referring now to both FIGS. 8 and 9 of the drawings, there is shown in FIG. 9 a side elevational view, taken along lines 9—9 of FIG. 8, which illustrates the even distribution of the melted sealing area 80 between the unmelted top cover line 68 and the unmelted case line 70 shown in dashed lines in FIG. 9. The melted and bonded area 80 will be formed with a uniform height shown by the arrow 82 along the transverse direction of the joint shown by the numeral 84 in FIG. 8. In addition, the bonded area 80 will be formed of a uniform height 94 along the longitudinal direction shown by the arrow 86 in FIG. 9. The numerals 88 and 92 along with the numerals 90 show the extent of the solidified rollover from the first step pressure application as previously described.

It can clearly be seen by referring to FIGS. 8 and 9 how the applicant's novel two step process as defined provides a bonded sealing space which is uniform throughout with substantially parallel top and bottom planar surfaces which are spaced apart at a height of approximately nine thousandths of an inch as shown by the numerals 82 and 94 in FIGS. 8 and 9. The sealing space thusly formed is substantially in the shape of a rectangular prism and is mixed and bonded better than prior art processes.

Bursting pressure tests on batteries heat sealed by the applicant's novel two step process have been conducted. Prior art one step sealed batteries as illustrated in FIG. 6 had a bursting pressure around 6 psi. Batteries sealed by the applicant's two step process had an increase in bursting pressure to 10 psi which represented a 66.7% increase in strength. The bursting pressure test is carried out by pressurizing one cell in a battery until the heat seal is broken and the pressure at which the cell bursts is the bursting pressure.

The magnitude of the force of the first lighter contact pressure is dependent on the set up of the heat sealing machine. In the applicant's experimental test, the top cover holder 30 was used to determine this force which was approximately 100 pounds. The magnitude of the second heavier contact pressure from the 100 pounds first pressure is also dependent on the set up of the heat sealing machine. The maximum force applied was approximately 1200 pounds in the experimental set up. The second heavier contact force was applied by increasing the 100 pound first force until it reached the 1200 pound maximum.

Referring now to FIG. 10 there is shown a diagrammatic representation of the heat sealing process using the two step pressure application as before described. The novel process can be used to heat seal batteries and also adjacent plastic butt joints as before described. In the first step shown as the numeral 96, the adjacent butt joints such as the battery top cover and case are provided along with the heat sealing device such as the heating platen 22. The second step shown as the numeral 98 comprises positioning the sealing surfaces of the butt joints against the sealing device for a predetermined time with a predetermined force and heating the surfaces with the heat sealing device to soften the surfaces to a near liquid state. A temperature of approximately 600 degrees Fahrenheit should be sufficient to obtain the near liquid state using presently designed battery cases and covers. The time will also vary from battery to battery and from machine to machine. In the applicant's machine a time of approximately 2-4 seconds was sufficient for the 4D and 8D type commercial battery. A 4D commercial battery is approximately 20 inches long and 6 inches wide with a height of 10 inches. An 8D commercial battery is the same length and height but is 8 inches wide. The positioning of the sealing surfaces against the heat sealing device (platen) causes heated rollover of the softened surfaces on the sides of the butt joint as before described.

Following this, in the next step shown as the numeral 100, the heating sealing device is removed from the sealing surfaces and in the following step shown as the numeral 102, the heated sealing surfaces of the butt joints are brought into contact with each other with a light first contact force of approximately 100 pounds. Thereafter in the next step shown as the numeral 104, the light first contact force is held for a predetermined time of approximately 3 seconds in the applicant's test to allow the heated rollover on the sides of the butt joint to solidify while the space between the sealing surfaces and the rollover remains molten.

Thereafter, in the next step shown as the numeral 106, a second contact force of a heavier amount is continuously applied from 100 pounds up to approximately 1200 pounds. This is held for approximately 3-4 seconds to mix and physically bond the molten polymers of the sealing surfaces with the solidified rollover acting as a dam to prevent further rollover from forming on the sides of the butt joint during the application of the second contact force as previously described. The last step shown by the numeral 108 is the releasing of the contact forces from the butt joints thereby allowing the joints to cool and providing a sealed butt joint having increased bursting strength.

Referring now to FIGS. 11-14 there will be described in greater detail the theory and experimental results obtained by the applicant's unique two step process. While the before described information regarding FIGS. 1-10 should be sufficient for those skilled in the art to understand the applicant's novel invention, the materials hereinafter provide a deeper understanding of the invention for those engineers and scientists who need further information in order to determine the variables and parameters of the process and the novel product obtained by the process. The discussion of the novel invention will be limited to the container or case but the principal is applicable to the top cover as well as other types of adjacent butt joints. Reference will also be made to FIGS. 4 and 5 showing the prior art conditions using a one step continuous force application and to FIGS. 7 and 8 showing the applicant's novel two step process.

During the melting process, the container 36 is pushed against the bottom of the platen 22 with a constant force, and the top cover 34 is pushed against the top of the platen 22, as shown in FIG. 4 of the drawings. At equilibrium, a small pool of melt is formed of thickness $\delta$, and the amount of molten polymer being displaced, rollover 52 and 53, is equal to the amount of solid polymer entering the pool of melt, clearly steady state melting.

After the battery container 36 and top cover 34 are removed from the platen 22, the cover and container are brought into contact with each other with a force just large enough to bring the two mating sealing surfaces 54 and 56 into contact with each other, but not with enough force to displace the polymer melt out of the bonding area. The bonding area is the before described sealing space between the top cover 34 and the case or container 36. This is the area shown by the numeral 80 in FIG. 8 of the drawings and the areas 60 and 62 shown in FIG. 7 of the drawings. The container 36 and top cover 34 are held in this position for a short period of time to allow the outside of the melt rollover 52 and 53 to solidify. The melt in between the rollover 52 and 53 in the bonding areas 60 and 62 (FIG. 7) will remain in the liquid state. After the short time delay, the container 36 and top cover 34 is pushed together with a greater force. With the outside of the bonding area 80 (FIG. 8) being in the solid state, the polymer in the liquid state in the bonding area 80 will be held in place and will not be displaced. Since the liquid polymer in the bonding area 80 is held in place during the squeeze, better mixing can be accomplished with results in a better bond.

A better bond can be accomplished by using a delayed squeeze to seal a battery container 36 and top cover 34 together by virtue of the fact that the delayed squeeze does not allow the liquid polymer to be displaced out of the bonding area 80 creating a better environment for mixing of the polymer. The following physical properties and dimensions were used in the experimental testing of the applicants invention:

PHYSICAL PROPERTIES AND DIMENSIONS $\delta$: Melt Thickness or Melt Depth
F: Force applied to container, 1171 lbs.
$\rho_m$: Density of solid polymer, 0.91 g/cm$^3$
$\rho_L$, $\rho_m$: Density of molten polymer 0.5 g/cm$^3$
$\mu$: Viscosity of polymer, 1000 N-s/m$^2$
i: Heat of fusion, 16.67 cal/g
$C_m$: Heat capacity of polymer, 0.46 cal/g °C.
$k_m$: Thermal conductivity of polymer, 3.3 E-4 cal-cm/s-cm$^2$- °C.
$T_b$: Temperature of platen, 600° F.
$T_m$: Melting point of polymer, 347° F.
$T_0$: Initial temperature of polymer, 80° F.
$T_l$: Temperature of molten polymer
$T_m$: Temperature of solid polymer
8D: Container sealing area, 8.557 in$^2$
8D: Container sealing length, 93.299 in
8D: Cover sealing area, 19.307 in$^2$
8D: Cover sealing length, 77.608 in
4D: Container sealing area, 7.720 in$^2$
4D: Container sealing length, 73.839 in
4D: Cover sealing area, 15.335 in$^2$
4D: Cover sealing length, 74.083 in Force on cover 715.5 lbs.

Equations A(20) and A(22) can be used to calculate the melt thickness.

$$\delta = \left( \frac{4\beta V_{SY}\mu Z}{F_N} X_0^3 \right)^{\frac{1}{4}}$$ Equation A(20)

Where Vsy, the upward velocity of the container wall, is given by equation A(22).

$$V_{SY} = \left( \frac{F_N}{4\mu\beta Z X_0^3} \right)^{\frac{1}{2}} \left( \frac{k_m(T_b - T_0)}{\rho_s[\lambda + C_s(T_m - T_0)]} \right)^{\frac{1}{2}}$$ Equation A(22)

Figures 11, 12:
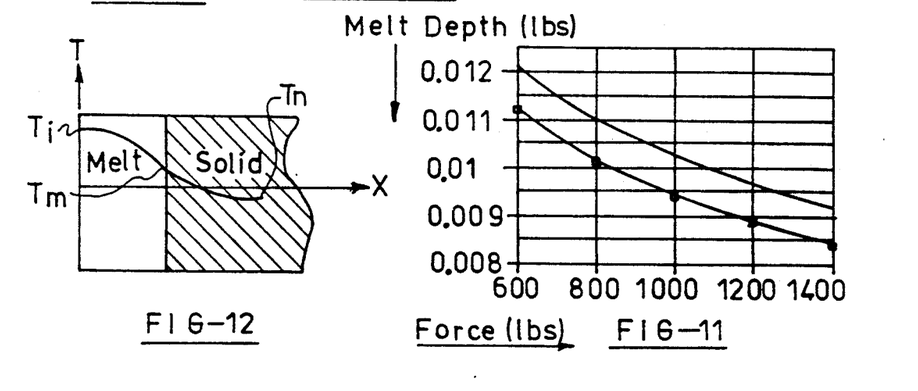
FIG. 11 is graph plotting the pressure (force/area) of the sealing surfaces versus the melt depth for group 4D and 8D containers.
FIG. 12 is a representation depicting how an increase in time without any use of melt stops Will only increase the amount of rollover and the dimensional melt and how with a melt stop, its melt depth will increase with time by heat conduction through the melt zone.

From Equations A(20) and A(22), it can be seen that the melt depth is a function of the force applied during the melting process, melting area, temperature, and the thermophysical properties of the polymer. FIG. 11 plots pressure, force/area of sealing surface, vs for group 4D and 8D containers. Without the use of melt stops, and the assumption that steady state is reached almost immediately upon contact with the platen, increasing or decreasing the time will have no effect on the melt depth.

Using a combination of melt stops and time, the dimensional melt and the melt depth can be increased to a desired level. An increase in time without any use of melt stops will only increase the amount of rollover 52 and 53 (FIGS. 4-6) or 64 and 66 (FIGS. 7-8), and the dimensional melt; but with a melt stop, its melt depth will increase with time by heat conduction through the melt zone. FIG. 12 depicts this situation. Equations B(16) and B(17) relate the temperature distribution to time and distance.

$$\frac{T_L - T_m}{T_1 - T_m} = 1 - \frac{erf\left(\frac{X_L}{2\sqrt{\alpha_L t}}\right)}{erf\left(\frac{K\beta}{2\sqrt{\alpha_L}}\right)}$$ Equation B(16)

$$\frac{T_s - T_m}{T_0 - T_M} = 1 - \frac{erfc\left(\frac{X_s}{2\sqrt{\alpha_L t}}\right)}{erfc\left(\frac{K}{2\sqrt{\alpha_s}}\right)}$$ Equation B(17)

Two additional assumptions made in using these equations are that the melt already produced is ignored, and that the temperature distribution from the initial melting is negligible. These assumptions were made to greatly simplify the derivation of the equations The amount of rollover can be calculated by multiplying the value of W in equation A(1) below by the time of melt.

Figure 13:
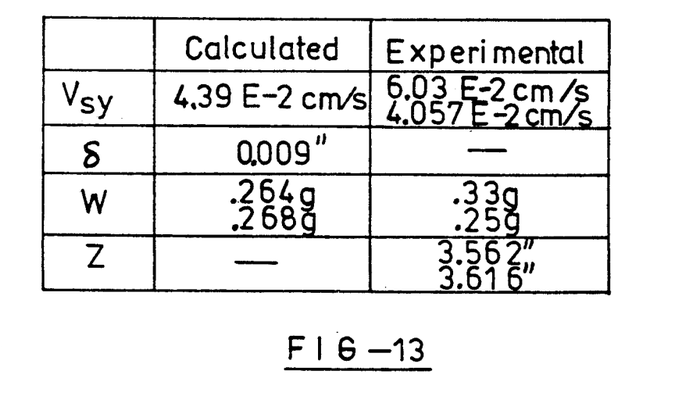
FIG. 13 is a table showing how the calculated values and the experimental results for the various parameters are in good agreement.
Figure 14:
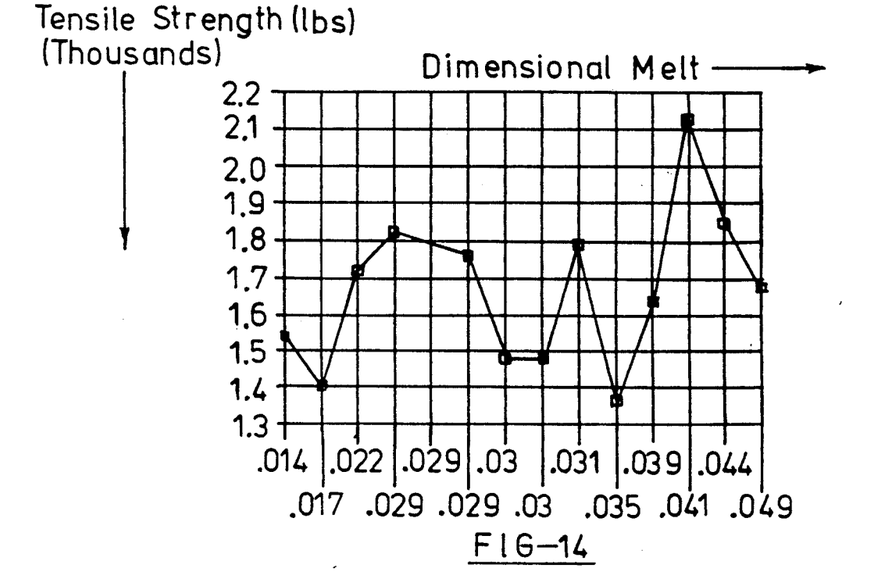
FIG. 14 is a graph plotting the tensile strength versus dimensional melt of the subject invention.
Figure 15:
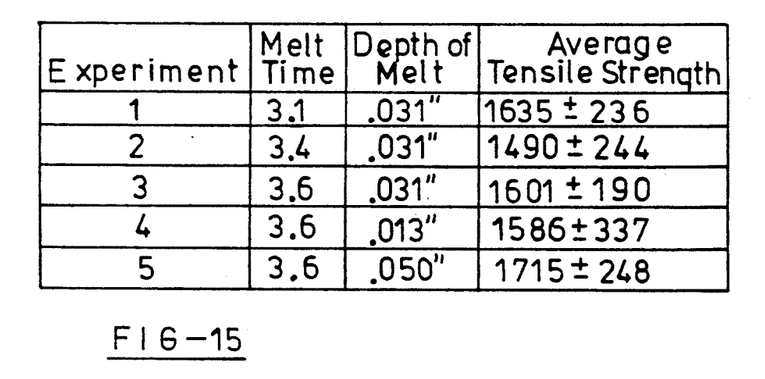
FIG. 15 is table showing the various experimental results of the applicant's invention.

The table shown in FIG. 13 lists the calculated and experimentally determined values for; Vsy, the velocity of the solid polymer; $\delta$, melt depth; w(t), the amount of rollover and Z, the linear length of the test specimen. This value was measured and was needed to calculate Vsy.

Multiplying the right hand side of equation A(1) below by time will give the amount of rollover, mass, for a specified length, z.

$$W = 2\rho_s V_{SY} X_0 Z t$$ Equation A(1)

Experimental values of W were obtained by melting a container 36 for a specified length of time with no melt stops. The rollover was then cut off the walls of the container and weighed. Z is the measured distance from which the rollover was taken. The experimental values for Vsy were obtained by measuring the dimensional melt, original height—height after melting, and dividing by the time of melting.

As can be seen from the table in FIG. 13, the calculated values are in good agreement with the experimental results. The deviation of the calculated values from the experimental values can be attributed to several factors:

1. Using estimated thermophysical property values instead of the actual values. For example, melting point, heat of fusion, coefficient of thermoconductivity, etc.
2. At the high temperature of the platen, 660° F.-800° F., some of the polymer is burned off.
3. Unevenness of container height.
4. The container and platen may not be touching square. If the container and platen are not perpendicular when melting starts, one side of the container will melt more than the other side. This problem has actually been observed.
5. Deviation from square of the container bottom.
6. Obstructions on the container bottom.
7. The assumption of a newtonian fluid may not be correct.

Of the seven factors stated for the difference between the experimental values and the calculated values, the container and platen not being perpendicular is the most probable cause. As can be seen from the graph in FIG. 14 and the table in FIG. 15 dimensional melt does not greatly affect the bond strength.

The temperature of the platen 22 effects the process in several ways. A higher platen temperature increases the rate of melting, which gives faster cycling time, but the higher temperatures also degrade the polymer resulting in a weaker bond. Higher temperatures also relieve the problem of the melt sticking to the platen 22.

After melting time is complete, the container 36 and top cover 34 are removed from the platen 22, the platen is moved out of the way, and the top cover 34 and container 36 are pushed together as shown in FIG. 5 of the drawings. During this process, the melt from the container 36 and the melt from the top cover 34 are first brought into contact with each other, and after a short time period, 'squeezed' together to form a stronger bond. The delayed squeeze, is the most critical step in the whole process.

The strength of the bond is obtained from the intimate mixing of the polymer melts from the top cover 34 and container 36. The strength of the bond is a direct result of the intermingling of the polymer chains. As depicted in FIG. 5 of the drawings, the force applied during the squeeze step produces a velocity in the x direction. Since the melt is still in the liquid state, and there is no resistance to flow, almost all of the melt is displaced from of the bonding area. Microscopic observations support this idea.

There are two important facts that determine how strong the heat sealing bond will be. These are:
1. A higher temperature on the platen, T 600° F., weakens the bond because the polymer is being thermally degraded. A higher temperature allows for faster machine cycling and reduces the amount of polymer sticking to the platen. A low temperature will help strengthen the bond because the polymer is not being thermally degraded as much. A low temperature has a slower machine cycling time, and the polymer has a tendency to stick to platen.
2. The final squeeze between the top cover 34 and container 36 is the most critical step in the process. From observations made on the breaks from tensile testing of the bonds, the bonds looked better in places where the melt was not displaced. Stronger bonds were produced when the melt was not allowed to be pushed out during the squeeze, therefore a "delayed squeeze" will be needed to effect a good bond throughout the entire battery. A delayed squeeze is this:

A. The top cover 34 and container 36, after they have been melted, are lightly brought into contact with each other. The contact is just light enough so that the melt rollover 64 and 66 (FIG. 8) from the container and cover are touching.
B. Both the top cover 34 and container 36 are held in this position just long enough so that the outside of the melt rollover solidifies, but the melt inside the melt rollover remains in the liquid state. This will essentially seal off the bonding area preventing the melt from being displaced with the delayed squeeze.
C. The container 36 and top cover 34 are then pushed together with a larger force. With the outside of the bonding areas blocked off, more mixing can occur of the center of the melt, and will result in a stronger bond.

in conclusion, the bond strength is proportional to the amount of mixing of the top cover 34 and container 36 melts during the squeezing step. Also, temperature plays a role due to the thermal degradation of the polymer at high temperatures. The melt depth will have a more pronounced effect on the resultant with a "delayed squeeze" because there will be more melt for mixing.

From the foregoing there has been described in brief detail and then in a more detailed explanation, the unique invention of the applicant. It should be apparent that changes may be made in the process and in the arrangement of the structure without departing from the spirit and scope of the invention. The applicant is not to be limited to the exact embodiment shown and described which has been given by way of illustration only. While the applicant's novel process has been described in the preferred embodiment as a two step process, it is within the spirit and scope of the invention that more than two pressure steps may be used to further improve the mixing and bonding depending upon the particular application of the type and materials of the mating butt joints.

Having described my invention, I claim:

1. A method for sealing a battery top cover, having a sealing surface, to a battery case, having a sealing surface, the top cover and the case having sides thereon, comprising the steps of:
(a) providing a battery top cover and case along with a battery heat sealing device having a heating platen for heating the sealing surfaces of the top cover and case;
(b) positioning the sealing surfaces of the top cover and the case against the heating platen with a force and heating the surfaces with the heating platen for a time to soften the surfaces to a near liquid state, the positioning of the sealing surfaces against the heating platen causing heated rollover of the softened surfaces on the sides of the top cover and the case;
(c) removing the heating platen from the sealing surfaces;
(d) bringing the heated sealing surfaces of the top cover and the case into contact with each other with at least a first contact force;
(e) holding the first contact force for a time to allow the heated rollover on the sides of the top cover and the case to solidify while the space between the sealing surfaces and the rollover remains molten;
(f) applying at least a second contact force for a time to the top cover and the case to mix and to physically bond the molten polymers from the sealing surfaces of the top cover and the case, with the solidified rollover preventing further rollover from forming on the sides of the top cover and the case during application of the second contact force; and (g) releasing the contact forces from the top cover and the case thereby providing a sealed battery having increased bursting strength.

2. The method as defined in claim 1 wherein the sealing surfaces of the top cover and the case are heated to approximately 600 degrees Fahrenheit by the heating platen.

3. The method as defined in claim 1 wherein the first contact force is approximately 100 pounds of force applied across the sealing surfaces.

4. The method as defined in claim 3 wherein the first contact force is held for approximately three seconds.

5. The method as defined in claim 1 wherein the second contact force is approximately 1200 pounds of force applied across the sealing surfaces continuously from 100 pounds to 1200 pounds.

6. The method as defined in claim 6 wherein the second contact force is held for approximately 3 to 4 seconds.

7. A method for sealing adjacent butt joints of plastic components, the butt joints having sealing surfaces and sides, comprising the steps of:

(a) providing the adjacent butt joints and a heat sealing device for heating the sealing surfaces of the butt joints;

(b) positioning the sealing surfaces of the butt joints against the heat sealing device with a force and heating the surfaces for a time with the heat sealing device to soften the surfaces to a near liquid state, the positioning of the sealing surfaces against the heat sealing device causing heated rollover of the softened surfaces on the sides of the butt joints;

(c) removing the heating device from the sealing surfaces;

(d) bringing the heated sealing surfaces of the butt joints into contact with each other with at least a first contact force;

(e) holding the first contact force for a time to allow the heated rollover on the sides of the butt joint to solidify while the space between the sealing surfaces and the rollover remains molten;

(f) applying at least a second contact force for a time to the butt joints to mix and to physically bond the molten polymer of the sealing surfaces with the solidified rollover preventing further rollover from forming on the sides of the butt joints during application of the second contact force; and (g) releasing the contact forces from the butt joints thereby providing a sealed butt joint having increased bursting strength.

* * * * *

UNITED STATES PATENT AND TRADEMARK OFFICE
CERTIFICATE OF CORRECTION

PATENT NO. : 5,197,994

DATED : MARCH 30, 1993

INVENTOR(S) : DONALD E. BROCKSMITH

It is certified that error appears in the above—identified patent and that said Letters Patent is hereby corrected as shown below:

Claim 6, Column 15, Line 22, should read "The method as defined in claim 5 wherein the"

Signed and Sealed this

Fifth Day of April, 1994

BRUCE LEHMAN

*Attest:*

*Attesting Officer*  *Commissioner of Patents and Trademarks*